US011030660B2

(12) United States Patent
Rubin et al.

(10) Patent No.: US 11,030,660 B2
(45) Date of Patent: Jun. 8, 2021

(54) COMMERCIAL BREAKS FOR LIVE VIDEOS

(71) Applicant: Facebook, Inc., Menlo Park, CA (US)

(72) Inventors: Clare Rubin, Belmont, CA (US); Chen Huang, Menlo Park, CA (US); Maria Angelidou, Menlo Park, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/865,590

(22) Filed: Jan. 9, 2018

(65) Prior Publication Data

US 2018/0227632 A1    Aug. 9, 2018

Related U.S. Application Data

(60) Provisional application No. 62/455,006, filed on Feb. 6, 2017.

(51) Int. Cl.
*G06Q 30/02* (2012.01)
*G06Q 50/00* (2012.01)
(Continued)

(52) U.S. Cl.
CPC ..... *G06Q 30/0277* (2013.01); *G06Q 30/0246* (2013.01); *G06Q 30/0269* (2013.01);
(Continued)

(58) Field of Classification Search
CPC .......... G06Q 30/0277; G06Q 30/0246; G06Q 50/01; G06Q 30/0269; H04N 21/458; H04N 21/812; H04N 21/2187
(Continued)

(56) References Cited

U.S. PATENT DOCUMENTS 8,402,094 B2    3/2013  Bosworth et al.
8,799,068 B2    8/2014  Kendall et al.
(Continued)

FOREIGN PATENT DOCUMENTS

CN    102843589 A    12/2012
CN    103797508 A    5/2014
(Continued)

OTHER PUBLICATIONS

International Search Report and Written Opinion for International Application No. PCT/ US2018/013255, dated Oct. 2, 2018.
(Continued)

*Primary Examiner* — Jason K Lin
(74) *Attorney, Agent, or Firm* — BakerHostetler

(57) ABSTRACT

In one embodiment, a method includes providing an interface that permits a first user to broadcast a live video to one or more second users. The method also includes determining that at least one predetermined condition for taking a commercial break during the live video has been met. The method also includes, after determining that at least one of the predetermined conditions has been met, displaying a selectable option within the interface that permits the first user to begin the commercial break. The method also includes, after receiving an indication that the first user has selected the selectable option to begin the commercial break, beginning the commercial break by ceasing to display the live video to the one or more second users after a predetermined amount of time and displaying one or more commercials to the one or more second users during the commercial break.

23 Claims, 10 Drawing Sheets

(51) Int. Cl.
*H04N 21/81* (2011.01)
*H04N 21/4788* (2011.01)
*H04N 21/442* (2011.01)
*H04L 29/08* (2006.01)
*H04N 21/2187* (2011.01)
*H04N 21/458* (2011.01)
*G06F 3/0485* (2013.01)

(52) U.S. Cl.
CPC ............ *G06Q 50/01* (2013.01); *H04L 67/22* (2013.01); *H04N 21/2187* (2013.01); *H04N 21/44222* (2013.01); *H04N 21/458* (2013.01); *H04N 21/4788* (2013.01); *H04N 21/812* (2013.01); *G06F 3/04855* (2013.01); *H04L 67/10* (2013.01); *H04L 67/20* (2013.01)

(58) Field of Classification Search
USPC ...................................... 725/32, 40; 715/738
See application file for complete search history.

(56) References Cited

U.S. PATENT DOCUMENTS

| | | | |
|---|---|---|---|
| 9,654,591 B2 | 5/2017 | Matus | |
| 9,990,652 B2 | 6/2018 | Zhang et al. | |
| 10,304,066 B2 | 5/2019 | Tseng et al. | |
| 2002/0042920 A1* | 4/2002 | Thomas | H04N 21/235 725/87 |
| 2008/0040475 A1 | 2/2008 | Bosworth et al. | |
| 2008/0195674 A1* | 8/2008 | Kim | G06F 16/957 |
| 2009/0070219 A1 | 3/2009 | D'Angelo et al. | |
| 2009/0119167 A1 | 5/2009 | Kendall et al. | |
| 2010/0205049 A1 | 8/2010 | Long | |
| 2010/0293059 A1* | 11/2010 | Davison | G06Q 30/02 705/14.69 |
| 2012/0158501 A1 | 6/2012 | Zhang et al. | |
| 2012/0166433 A1 | 6/2012 | Tseng | |
| 2012/0166532 A1 | 6/2012 | Juan et al. | |
| 2014/0068662 A1* | 3/2014 | Kumar | H04N 21/23424 725/34 |
| 2014/0095606 A1 | 4/2014 | Matus | |
| 2014/0245352 A1* | 8/2014 | Tseng | H04N 21/4668 725/40 |
| 2014/0359667 A1 | 12/2014 | Kilar | |
| 2015/0067819 A1* | 3/2015 | Shribman | H04L 67/32 726/12 |
| 2015/0326814 A1* | 11/2015 | Stephens | H04N 5/445 725/32 |
| 2015/0350358 A1* | 12/2015 | Nguyen | H04L 51/12 709/204 |
| 2015/0358688 A1* | 12/2015 | Kummer | H04N 21/812 725/9 |
| 2016/0249109 A1* | 8/2016 | Nelson | H04N 21/4586 |
| 2016/0360244 A1 | 12/2016 | Einarsson | |
| 2017/0193549 A1 | 7/2017 | Mathur | |

FOREIGN PATENT DOCUMENTS

| | | |
|---|---|---|
| CN | 105791889 A | 7/2016 |
| CN | 105898446 A | 8/2016 |
| WO | 2007128079 A1 | 11/2007 |
| WO | 2011/139622 A2 | 11/2011 |

OTHER PUBLICATIONS

Simo, "Introducing New Ways to Create, Share and Discover live Video on Facebook" Facebook Newsroom, XP055418200, Apr. 6, 2016, Retrieved from the Internet: URL:https://newsroom.fb.com/news/2016/04/introducing-new-ways-to-create-share-and-discover-live-video-on-facebook/ on Oct. 23, 2017; 8 Pages.

Heath, "Facebook is making live video a huge part of its app" Business Insider, XP055440354, Apr. 6, 2016, Retrieved from the Internet: URL:http://www.businessinsider.com/facebook-live-video-gets-new-facelift-2016-4?international=true&r=US&IR=T on Dec. 1, 2018; 5 Pages.

Lavrusik, "Expanding Live Video to More People" Facebook Newsroom, XP055418580, Jan. 28, 2016, Retrieved from the Internet: URL: https://newsroom.fb.com/news/2016/01/expanding-live-video/ on Oct. 24, 2017; 3 Pages.

* cited by examiner

COMMERCIAL BREAKS FOR LIVE VIDEOS

PRIORITY

This non-provisional application claims priority to U.S. Provisional Patent Application No. 62/455,006 filed Feb. 6, 2017.

TECHNICAL FIELD

This disclosure generally relates to videos and more particularly to commercial breaks for live videos.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality fab wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments provide users of a social network the ability to take commercial breaks during live videos that they broadcast to other uses of the social network. For example, a user may be provided with a broadcaster interface that allows the user to broadcast a live video to one or more viewers (e.g., friends). If one or more conditions are met, the user may be presented with an option during the live video to take a commercial break. For example, if a certain amount of time has passed since the beginning of the video or since the last commercial break (e.g., five minutes), a selectable option for taking a commercial break may be displayed in the broadcaster interface. If the user selects the selectable option to take the commercial break, the live video may cease playing to the viewers after a certain amount of time (e.g., ten seconds) and the commercial break may begin. In some embodiments, a countdown timer is shown in the broadcaster interface that counts down the time until the beginning of the commercial break. In some embodiments, another countdown timer may be shown in the broadcaster interface that counts down the time until the commercial break is over.

During the commercial break, one or more commercials are shown to the viewers of the live video. In some embodiments, the one or more commercials that are shown to the viewers may be relevant to each particular viewer. For example, if a particular viewer had previously "liked" a page on the social network for a specific product, a commercial for that product may be shown to the particular viewer during the commercial break.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
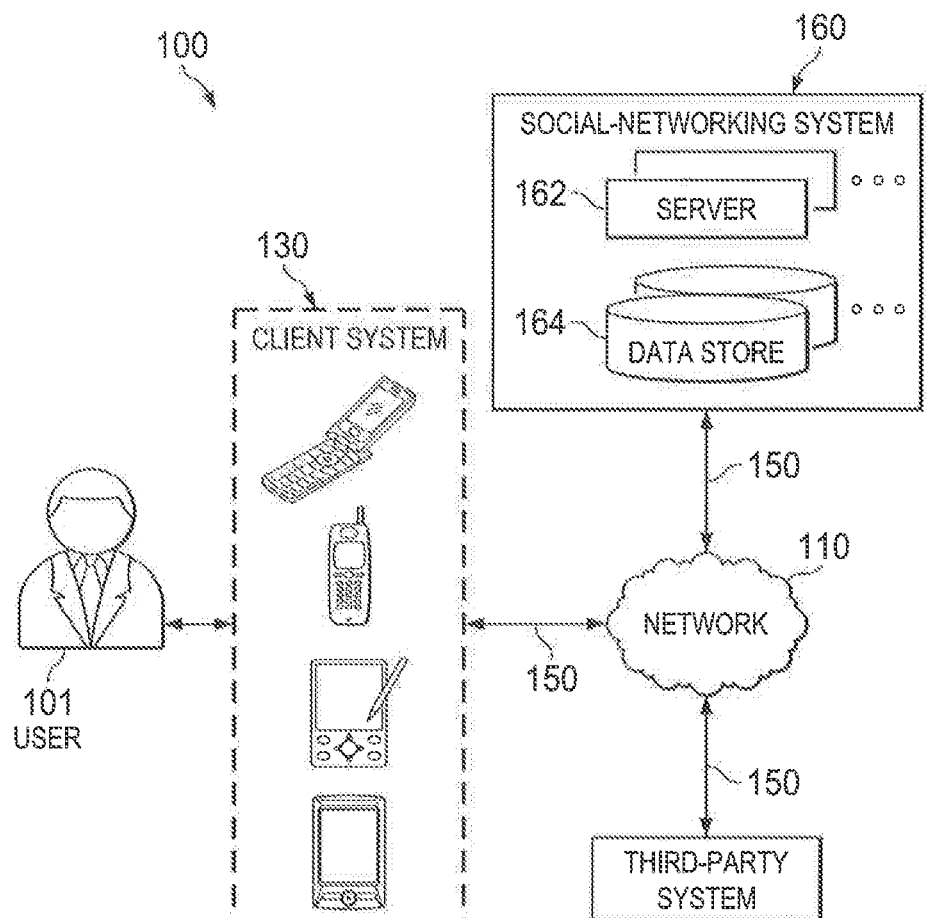
FIG. 1 illustrates an example network environment associated with a social-networking system.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple client systems 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, one or more users 101 may use one or more client systems 130 to access, send data to, and receive data from social-networking system 160 or third-party system 170.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable user 101 to access network 110. A client system 130 may enable its user 101 to communicate with other users 101 at other client systems 130.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs (e.g., social graph 200) in one or more data stores 164. In particular embodiments, a social graph may include multiple nodes—which may include multiple user nodes (each corresponding to a particular user 101) or multiple concept nodes (each corresponding to a particular concept)—and multiple edges connecting the nodes. Social-networking system 160 may provide users 101 of the online social network the ability to communicate and interact with other users 101. In particular embodiments, users 101 may join the online social network via social-networking system 160 and then add connections (e.g., relationships) to a number of other users 101 of social-networking system 160 to whom they want to be connected. Herein, the term "friend" may refer to any other user 101 of social-networking system 160 with whom a user 101 has formed a connection, association, or relationship via social-networking system 160.

In particular embodiments, social-networking system 160 may provide users 101 with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system. 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
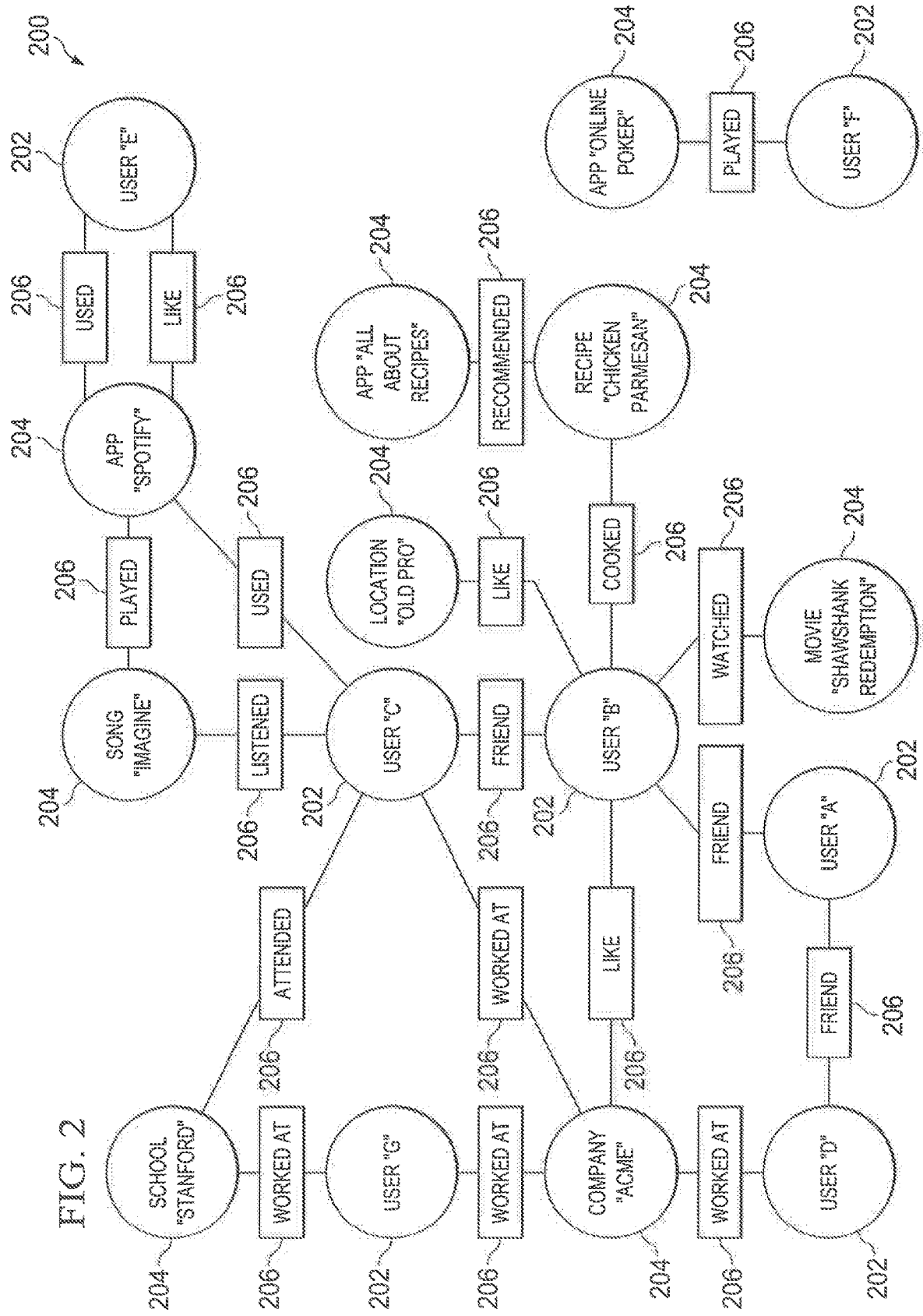
FIG. 2 illustrates an example social graph.

FIG. 2 illustrates an example social graph 200. In particular embodiments, social-networking system 160 may store one or more social graphs 200 in one or more data stores. In particular embodiments, social graph 200 may include multiple nodes which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-pally webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine. Whether one or more of the actions indicate an affinity for subject matter, content, other users, and so forth. As an example and not by way of limitation, if a user frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information.

Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system, in response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

FIGS. 3A-3G illustrate various broadcaster interfaces 300 (e.g., 300A-300G) for broadcasting a live video 310 and for providing commercial breaks during live video 310. Broadcaster interface 300 may be displayed to users 101 using any appropriate client system 130. For example, broadcaster interface 300 may be displayed on a smartphone 130.

In general, broadcaster interface 300 allows user 101 to broadcast live video 310 to one or more viewers (e.g., other friends or users 101) and to take one or more commercial breaks during live video 310. In some embodiments, if one or more conditions are met, user 101 may be presented with an option during live video 310 to take a commercial break. For example, if a certain amount of time has passed since the beginning of live video 310 or since the last commercial break (e.g., five minutes), a selectable option for taking a commercial break may be displayed in broadcaster interface 300. If user 101 selects the selectable option to take the commercial break, live video 310 may cease playing to the viewers after a certain amount of time (e.g., ten seconds) and the commercial break may begin. During the commercial break, one or more commercials are shown to the viewers of live video 310. In some embodiments, the one or more commercials that are shown to the viewers may be relevant to each particular viewer. For example, if a particular viewer had previously "liked" a page on social networking system 160 for a specific product, a commercial for that product may be shown to the particular viewer during the commercial break.

As used herein, a "live video" such as live video 310 may refer to a video stream or any other form of multimedia that is transmitted over network 110 such as the Internet in real time or in near real time. For example, rather than wait for the entire video to arrive before making it available to other users 101, a computing system of social networking system 160 (e.g., server 162) may continuously receive/capture the received live video stream from client system 130 and immediately broadcast it to other users 101 of social networking system 160. In some embodiments, client system 130 may capture the live video stream by using a video camera, microphone, speaker, or any other mechanism of client system 130 to record video and/or audio. In certain embodiments, a video stream may comprise a video component, an audio component, or both a video and audio component. Multiple other users 101 of social networking system 160 may simultaneously view the live video using, for example, a mobile application or website of social networking system 160.

Figure 3A:
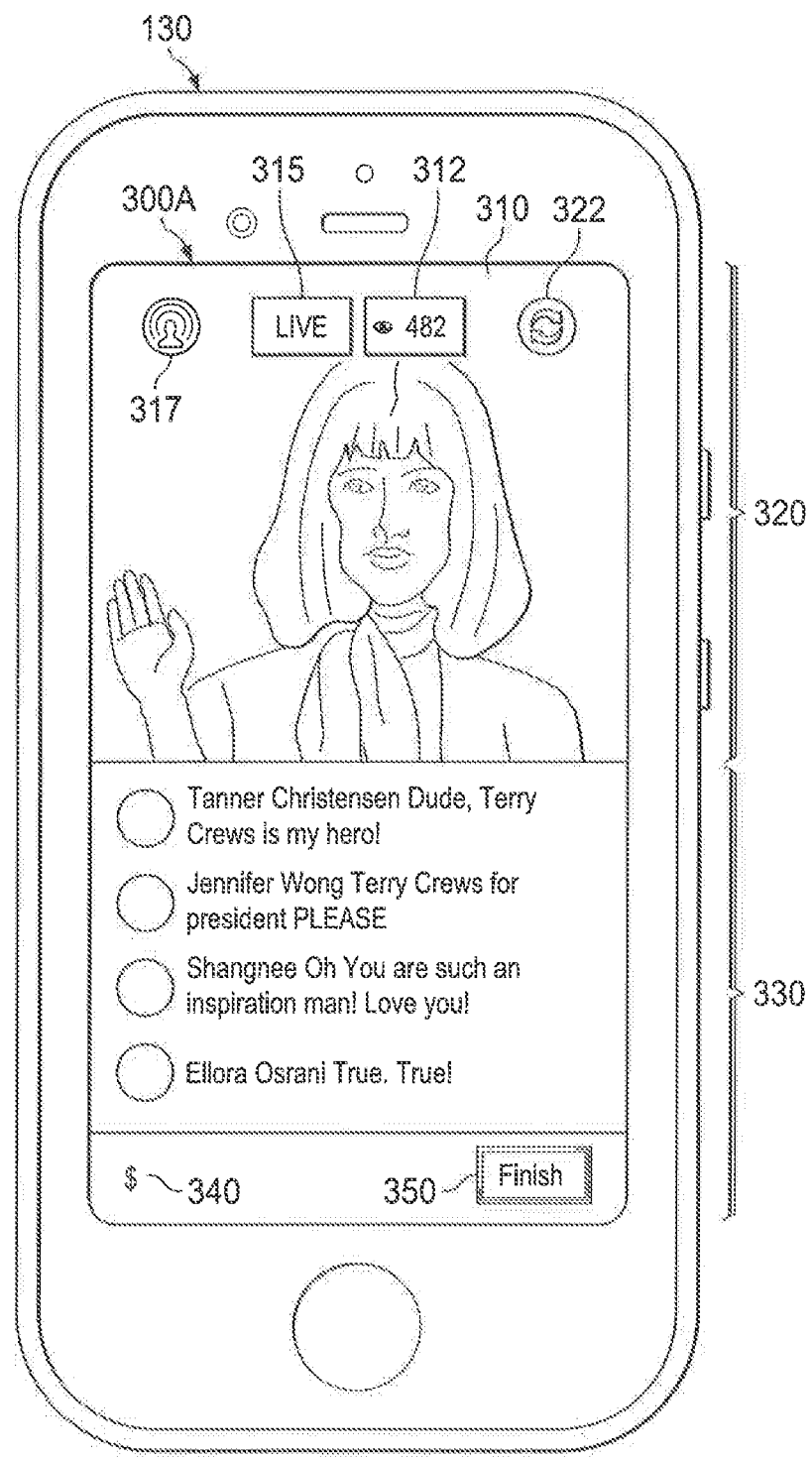
FIGS. 3A-3G illustrate various views of a broadcaster interface for broadcasting live videos and for providing commercial breaks during the live videos.

FIG. 3A illustrates broadcaster interface 300A before user 101 has chosen to take a commercial break. Broadcaster interface 300A includes a live video area 320, a comment area 330, a commercial break option 340, and a finish option 350. Live video 310 may be displayed in live video area 320, which in some embodiments may appear at the top of broadcaster interface 300A as illustrated. In other embodiments, live video area 320 may be in any other location within broadcaster interface 300 and may have any shape or size. Likewise, comment area 330, which displays comments that are posted to social networking system 160 by viewers while they are viewing live video 310, may be displayed in any portion of broadcaster interface 300A and may have any shape or size. Commercial break option 340, as discussed in more detail below, permits user 101 to take a commercial break during live video 310. Finish option 350 may be selected by user 101 to stop broadcasting live video 310.

In some embodiments, broadcaster interface 300 may include a view count 312, a live indication 315, a photo option 317, and a camera option 322. View count 312, which may be displayed over live video 310 in some embodiments as illustrated, provides an indication of how many viewers are currently viewing live video 310. Live indication 315 is any appropriate indication displayed in broadcaster interface 300 to indicate to user 101 that they are currently broadcasting live video 310. Photo option 317 is a selectable option that permits user 101 to take a photo screenshot during live video 310. Camera option 322 is a selectable option that permits user 101 to select a camera of client device 130 to use to capture live video 310 (e.g., select between a camera on the front or rear of client device 130).

In general, commercial break option 340 permits user 101 to choose to take a commercial break during live video 310. Commercial break option 340 may have any appearance within broadcaster interface 300. For example, commercial break option 340 may be any logo, button, image, text, or combination of two or more these. In some embodiments, commercial break option 340 may be a dollar sign ($) as illustrated in FIG. 3A.

Figure 3B:
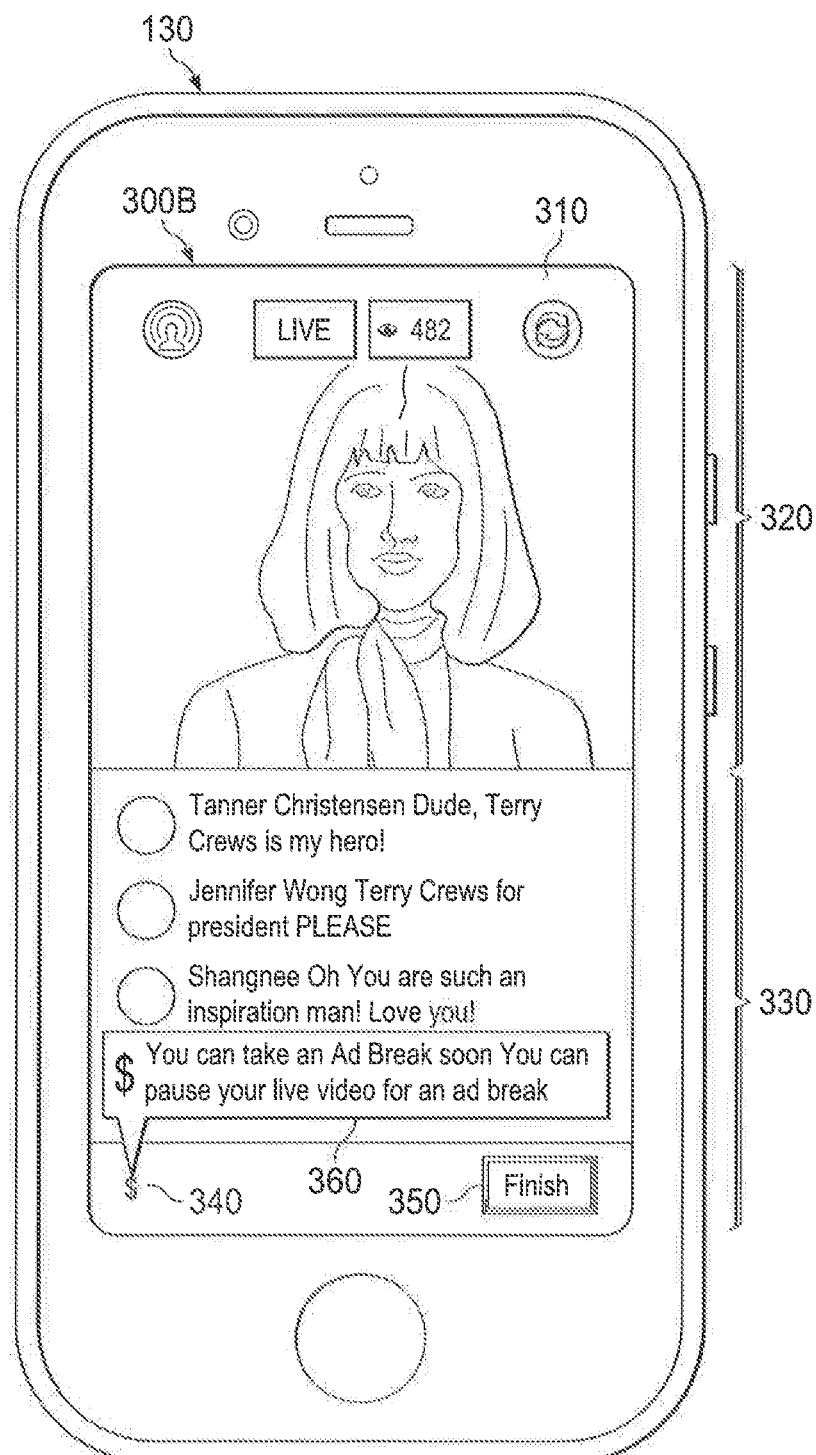
Figure 3C:
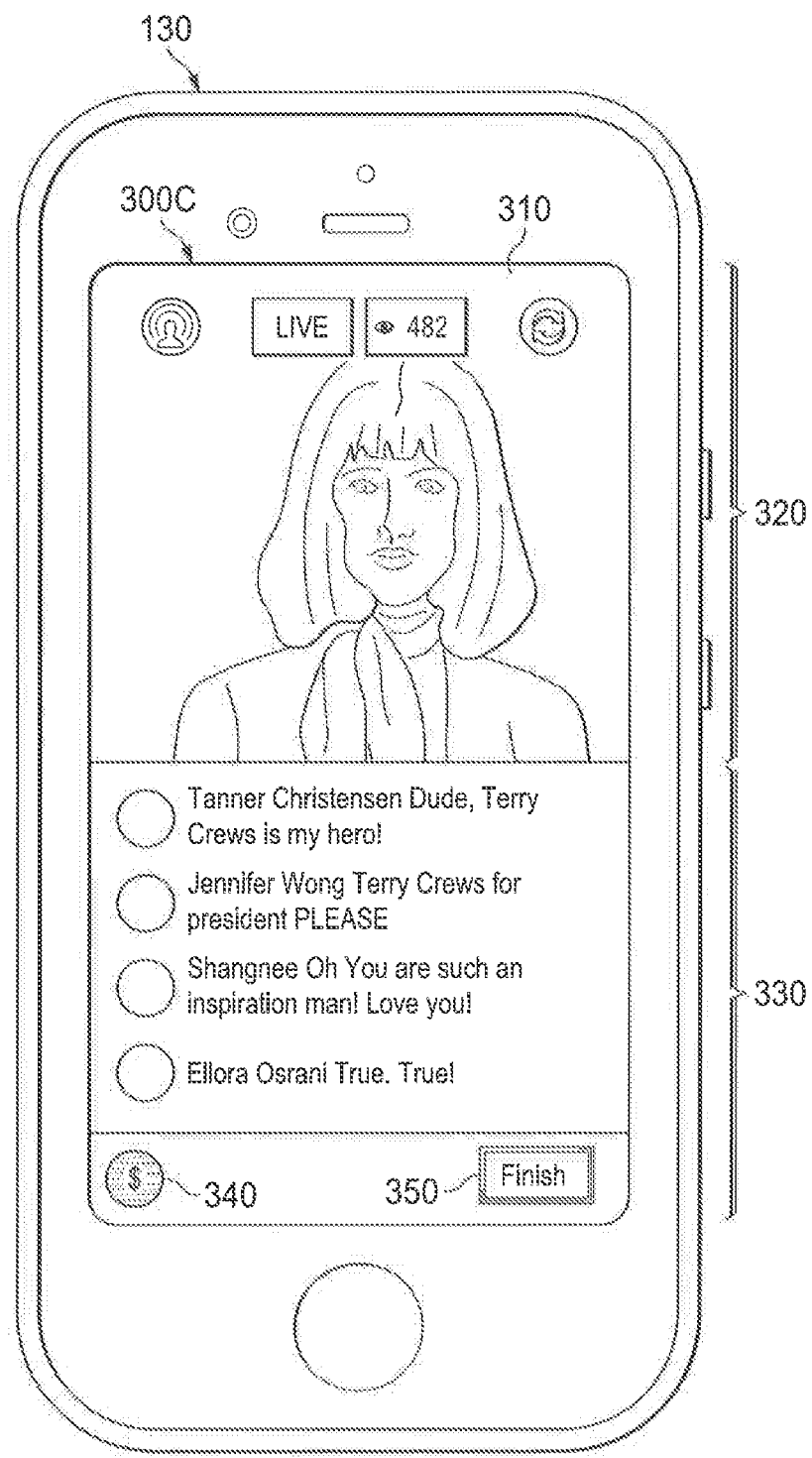
Figure 3D:
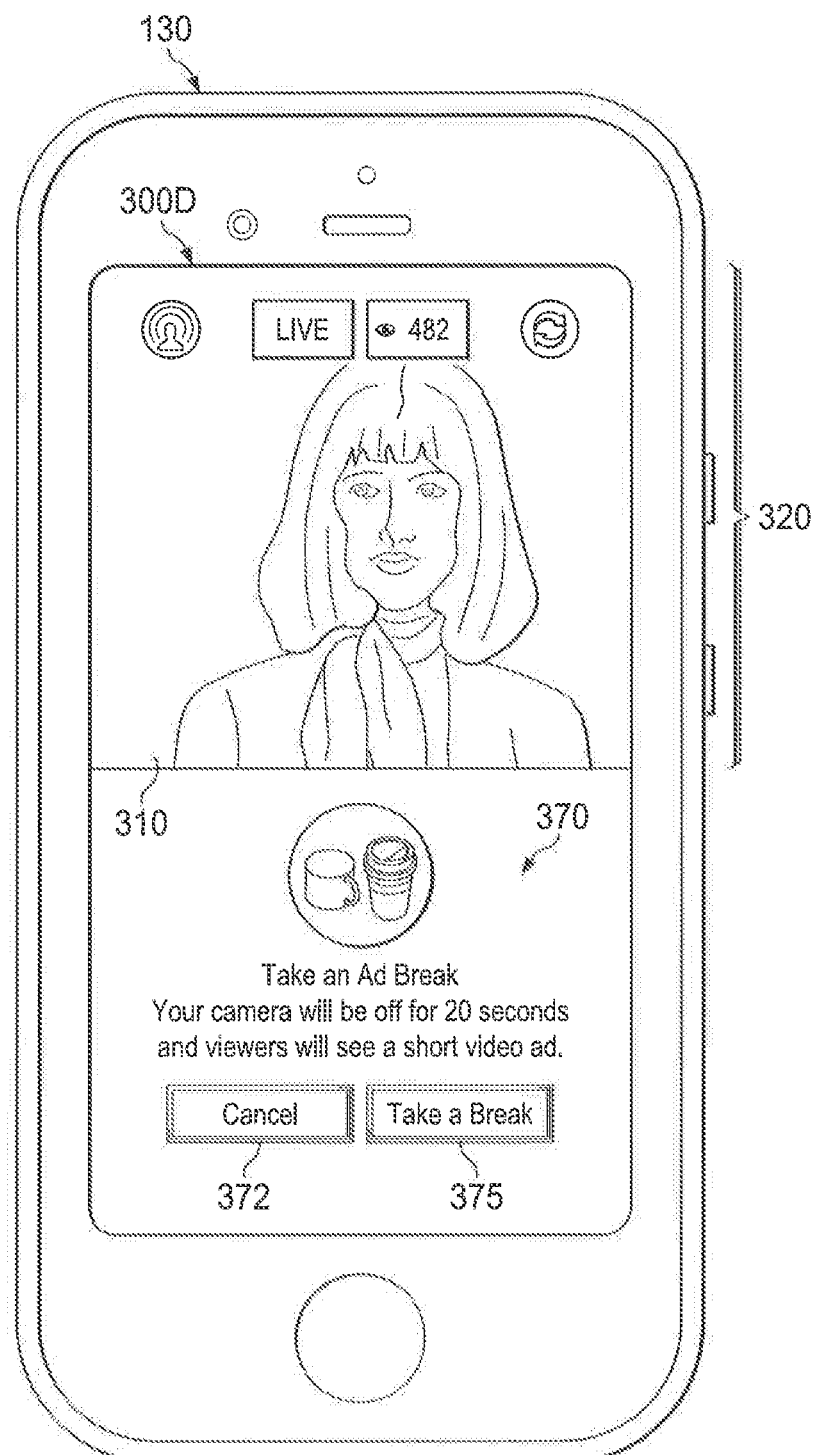
Figure 3E:
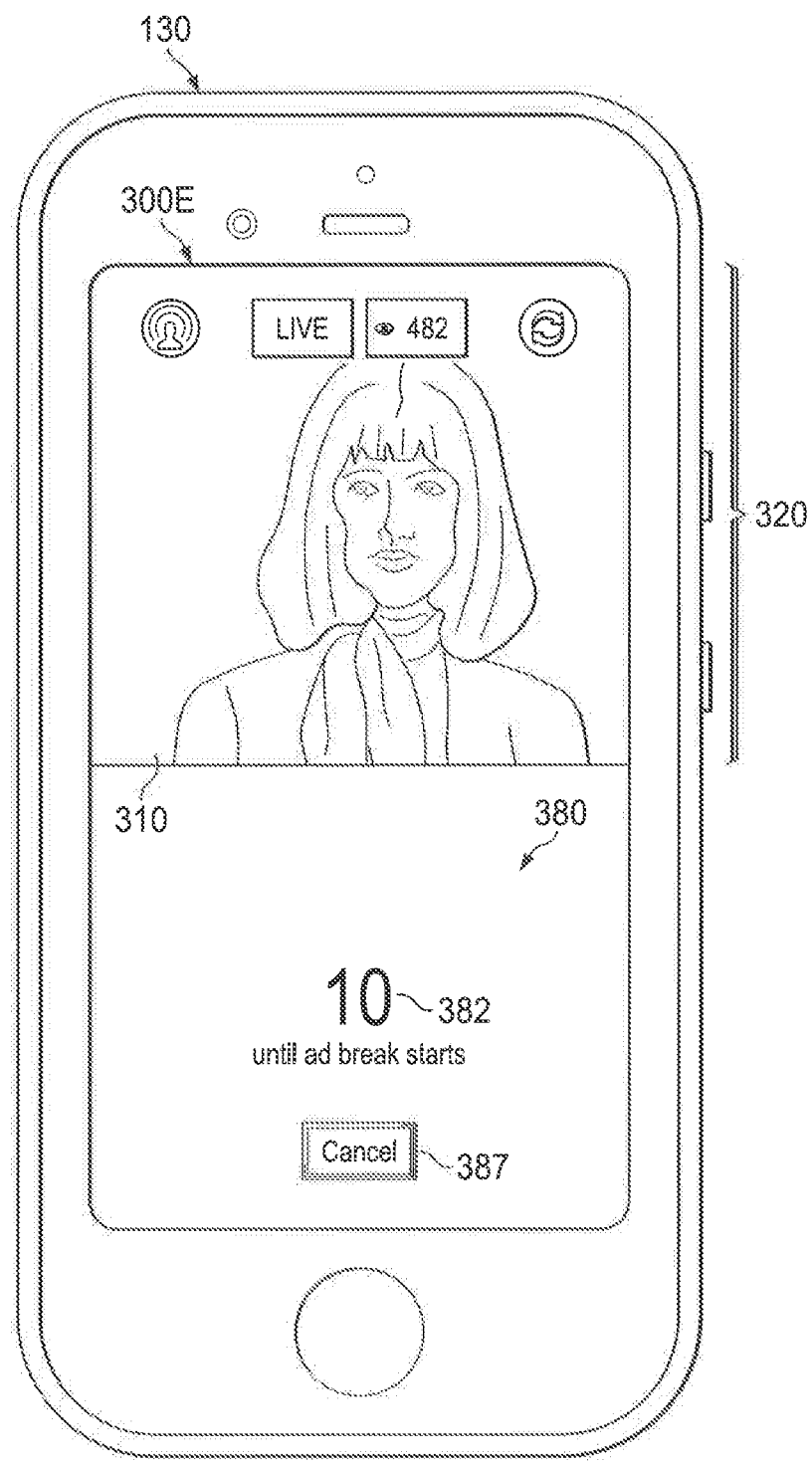

In certain embodiments, commercial break option 340, once selected by user 101, performs various actions depending on whether or not certain predetermined conditions have been met for taking a commercial break during live video 310. For example, if a commercial break is not currently available, a selection of commercial break option 340 may cause a commercial break unavailable notification 360 to be displayed in broadcaster interface 300 as illustrated in FIG. 3B. On the other hand, if a commercial break is currently available, a selection of commercial break option 340 may immediately cause the commercial break to begin or may cause a commercial break available notification 370 to be displayed in broadcaster interface 300 as illustrated in FIG. 3D. In certain embodiments, if a commercial break is currently available, a selection of commercial break option 340 may cause a commercial break starting notification 380 to be displayed in broadcaster interface 300 as illustrated in FIG. 3E.

In some embodiments, user 101 may take a commercial break during live video 310 at any time and as many times as they desire during live video 310. In other embodiments, however, one or more predetermined conditions for taking a commercial break during live video 310 must first be met before user 101 is permitted to take a commercial break. For example, the predetermined condition for taking a commercial break during live video 310 may include one or more of the following:
  a minimum amount of time has elapsed since live video 310 began (e.g., live video 310 must be broadcast for at least five minutes before the first commercial break can be taken);
  a minimum amount of time has elapsed since a previous commercial break (e.g., commercial break can only be taken every five minutes);
  user 101 is a member of a pre-approved group of users;
  user 101 has a number of followers at or above a threshold number of followers (e.g., user 101 has at least 100 followers);
  live video 310 has a number of viewers at or above a threshold number of viewers (e.g., there are at least 100 viewers viewing live video 310); and
  one or more prior live videos by user 101 had a number of viewers at or above a threshold number of viewers (e.g., there were at least 100 viewers who viewed the previous live video 310 by user 101).

In some embodiments, commercial break option 340 may have a different appearance depending on Whether or not a commercial break is currently available to be taken. For example, commercial break option 340 may have a different color, have a different shape, have different shading (i.e., grayed out when not available), be flashing, etc. depending on whether or not a commercial break can currently be taken. As a specific example, if a commercial break is not currently available, commercial break option 340 may have an appearance such as illustrated in FIGS. 3A-3B. On the other hand, if a commercial break is currently available, commercial break option 340 may have an appearance such as illustrated in FIG. 3C. In some embodiments, if a commercial break is not currently available, commercial break option 340 may not be visible at all in broadcaster interface 300 and may appear once a commercial break becomes available.

FIG. 3B illustrates broadcaster interface 300B after user 101 has selected commercial break option 340 but before a commercial break is available. Selecting commercial break option 340 in this scenario may cause commercial break unavailable notification 360 to be displayed in broadcaster interface 300B as illustrated. Such a notification may indicate to user 101 that they are not currently permitted to take a commercial break in live video 310. For example, commercial break unavailable notification 360 may include a note that "You can take an Ad Break soon. You can pause your live video for an ad break." In some embodiments, commercial break unavailable notification 360 may be displayed after user 101 has selected commercial break option 340 but before one or more of the predetermined conditions as discussed above are met. In some embodiments, commercial break unavailable notification 360 may indicate one or more conditions that must be met before user 101 can take a commercial break (e.g., "You must wait 3 more minutes before you can take a commercial break.").

FIG. 3C illustrates broadcaster interface 300C when a commercial break is available to be taken during live video 310. As illustrated in this figure, commercial break option 340 has changed appearance from FIG. 3A to indicate to user 101 that a commercial break is available to be taken. In other embodiments, however, commercial break option 340 may have any other appearance, or may always have the same appearance. In some embodiments, selecting commercial break option 340 when a commercial break is available to be taken may result in commercial break available notification 370 being displayed, as illustrated in FIG. 3D. In some embodiments, selecting commercial break option 340 when a commercial break is available to be taken may result in commercial break starting notification 380 to be displayed in broadcaster interface 300 as illustrated in FIG. 3E. In other embodiments, selecting commercial break option 340 may cause a commercial break to begin immediately regardless of any other conditions and without any delay of time (e.g., no countdown timers as described below).

FIG. 3D illustrates broadcaster interface 300D where commercial break available notification 370 is being displayed. In some embodiments, commercial break available notification 370 may be displayed after user 101 has selected commercial break option 340 and a commercial break is currently available to be taken. Commercial break available notification 370 may have any size, shape, and appearance within broadcaster interface 300D. In some embodiments, commercial break available notification 370 may replace comment area 330 as illustrated in FIG. 3E. In some embodiments, commercial break available notification 370 may include an option 375 to begin the commercial break and a cancel option 372 which may remove commercial break available notification 370 and return user 101 to broadcaster interface 300C.

In some embodiments, selecting option 375 in broadcaster interface 300D of FIG. 3D may cause commercial break starting notification 380 to be displayed in broadcaster interface 300E as illustrated in FIG. 3E. Commercial break starting notification 380 may include a first countdown timer 382 and a cancel option 387. First countdown timer 382 may dynamically display the amount of time until the commercial break begins and may start at any amount of time before the commercial break begins (e.g., ten seconds). Cancel option 387 may cancel the commercial break before it begins and return user 101 to another broadcaster interface 300 such as broadcaster interface 300C. Once first countdown timer 382 reaches zero (or any appropriate amount of time before zero), the commercial break may begin and interface broadcaster interface 300F as illustrated in FIG. 3F may be displayed.

Figure 3F:
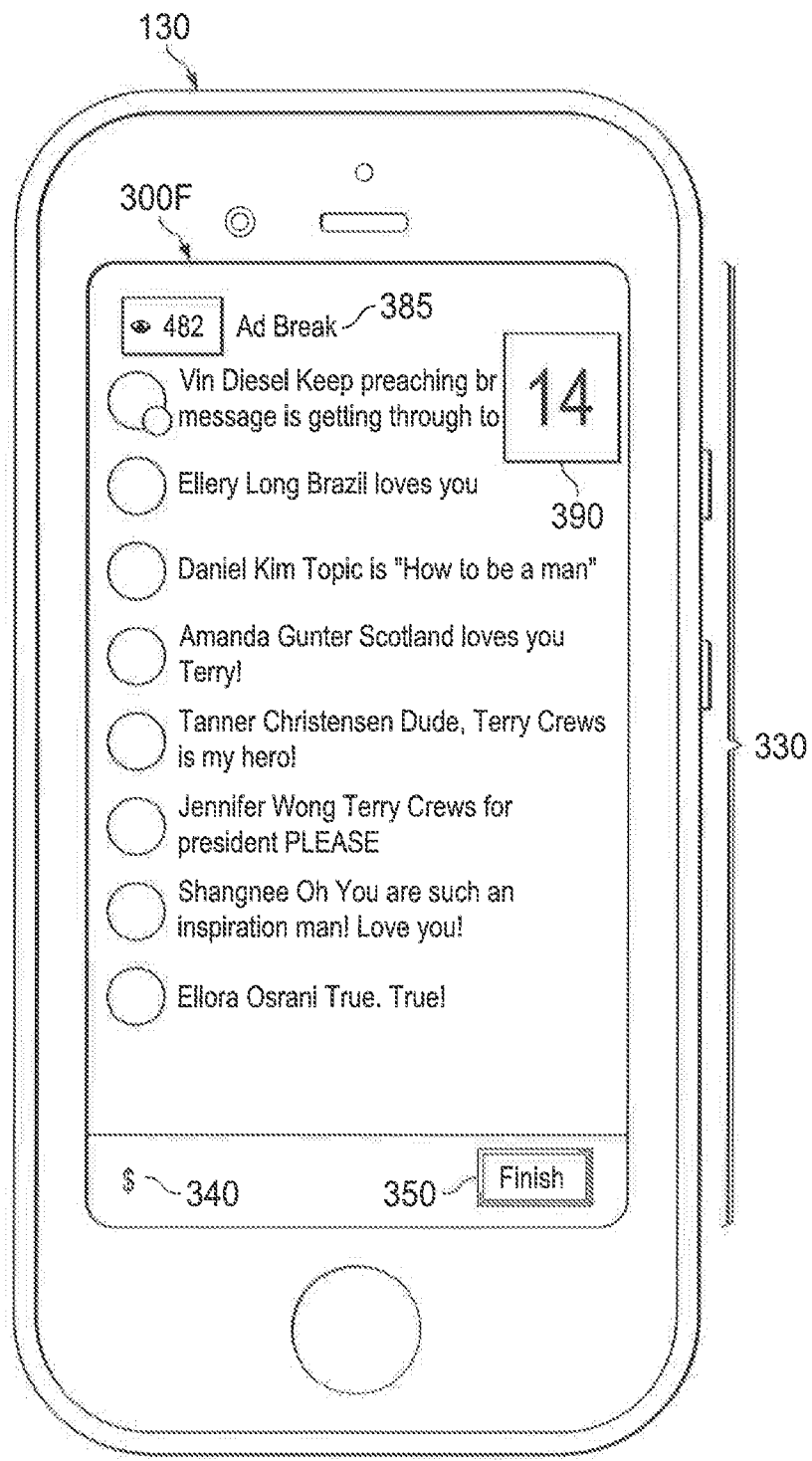

FIG. 3F illustrates broadcaster interface 300F that may be displayed to user 101 while the viewers of live video 310 are viewing one or more commercials. In this example, broadcaster interface 300F includes comment area 330 that has expanded to cover live video area 320. This may allow user 101 to view more comments during the commercial break of live video 310. Broadcaster interface 300F may also include an ad break indication 385 and a second countdown timer 390. Ad break indication 385 may provide an indication to user 101 that the other viewers of their live video 310 are currently viewing one or more commercials. Second countdown timer 390 dynamically counts down the amount of time until the commercial break ends and live video 310 resumes. Second countdown timer 390 may have any shape or appearance, may be located within any portion of broadcaster interface 300F, and may start at any amount of time before the end of the commercial break. In some embodiments, second countdown timer 390 may appear in broadcaster interface 300F as soon as the commercial break begins. In other embodiments, second countdown timer 390 may not appear in broadcaster interface 300F until a certain amount of time before the commercial break ends (e.g., fifteen seconds before the end of the commercial break). In some embodiments, second countdown timer 390 may include a background image that is a screen capture of a video frame of live video 310. For example, the background image may be the last frame of live video 310 before the commercial break began and may be blurred.

Figure 3G:
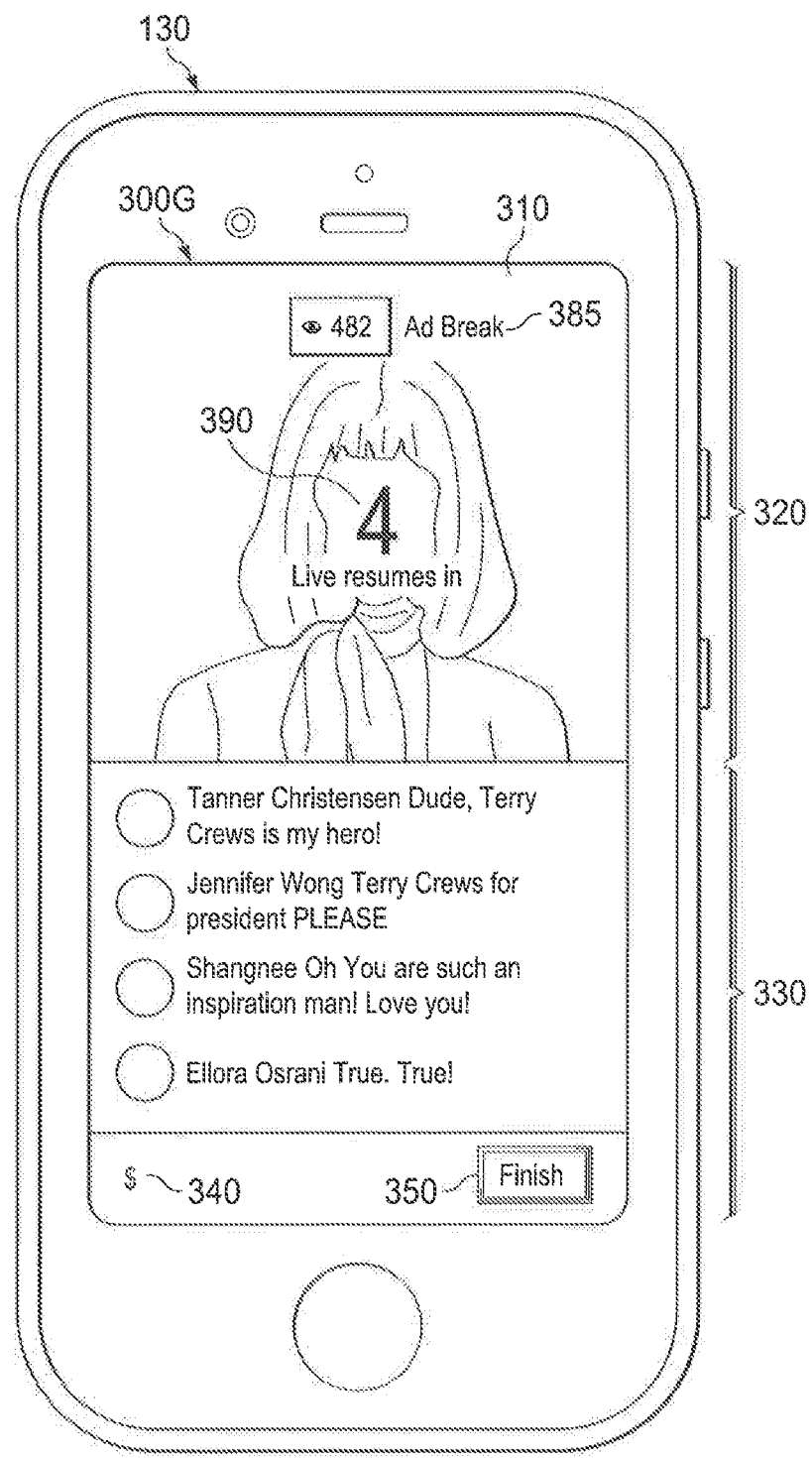

FIG. 3G illustrates broadcaster interface 300G that may be displayed to user 101 a predetermined amount of time before the end of the commercial break within live video 310. For example, when second countdown timer 390 reaches ten seconds in broadcaster interface 300F, broadcaster interface 300G may be displayed to user 101 so that user 101 may be prepared for live video 310 to resume. Broadcaster interface 300G is similar to broadcaster interface 300A that includes live video area 320 and comment area 330. However, second countdown timer 390 may be displayed on top of live video 310 in live video area 320 of broadcaster interface 300G in order to give user 101 notice of when live video 310 will resume. Once second countdown timer 390 reaches zero, live video 310 may resume and second countdown timer 390 may disappear.

During the commercial break of live video 310, any number of commercials may be displayed to the viewers of live video 310. In some embodiments, the commercials shown to the viewers of live video 310 may be selected by social networking system 160 to be relevant/personalized to each viewer. For example, social networking system 160 may select a first group of commercials that are relevant to a first viewer 101a and a second group of commercials that are relevant to a second viewer 101b. The first and second group of commercials may or may not be the same (i.e., the first viewer 101a may be shown different commercials from second viewer 101b based on their interests). To do so, social networking system 160 may first access a pool of available commercials and then select, for each particular viewer, one or more relevant commercials from the pool of available commercials for each particular viewer. Any appropriate method may be used by social networking system 160 to determine relevant commercials for a particular viewer. In some embodiments, the commercials may be based on the context of live video 310 (e.g., the words being spoken in live video 310) as described in U.S. patent application Ser. No. 14/989,726, which is incorporated herein by reference in its entirety. Other particular examples of selecting relevant commercials are discussed in more detail below.

In some embodiments, the commercials shown to the viewers of live video 310 during commercial breaks may be relevant to each particular viewer. In some embodiments, relevant commercials may be determined from social graph 200 (e.g., from coefficients as described above). For example, if a particular viewer had previously "liked" a page on the social network for a specific product, a commercial for that product may be shown to the particular viewer during the commercial break. As another example, if the viewer had previously shared a post by a particular entity on social networking system 160, a commercial related to that particular entity may be shown to the viewer during the commercial break.

In some embodiments, the commercials shown to the viewers of live video 310 during commercial breaks may be auction-based. For example, advertisers may be permitted to submit bids for their advertisements to be shown during certain live videos 310 (e.g., based on category, type, broadcaster, etc.). Social networking system 160 may then conduct an auction to select the highest bid as the winning advertisement. The commercial(s) associated with the winning bid may then be shown during the commercial break.

Particular embodiments may facilitate the delivery of commercials to users that are more likely to find the commercials more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 160 to identify those users. In addition or as an alternative, social-networking system 160 may use user-profile information in social-networking system 160 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 160, off or outside of social-networking system 160, or on mobile computing devices of users. When on or within social-networking system 160, such targeting may be directed to users' news feeds, search results, e-mail or other in-boxes, or notifications channels or may appear in particular area of web pages of social-networking system 160, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 160, such targeting may be provided through a third-party website, e.g., involving an ad exchange or a social plug-in. When on a mobile computing device of a user, such targeting may be provided through push notifications to the mobile computing device.

Targeting criteria used to identify and target users for commercials may include explicit, stated user interests on social-networking system 160 or explicit connections of a user to a node, object, entity, brand, or page on social-networking system 160. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with commercials, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who flaw Interacted With an Object Associated with the Advertising" and filed 15 Dec. 2010 as U.S. patent application Ser. No. 12/968,786; or U.S. Patent Application Publication No, 2012/0166532, entitled "Contextually Relevant Affinity Prediction in a Social-Networking System" and filed 23 Dec. 2010 as U.S. patent application Ser. No. 12/978,265.

Commercial breaks shown during live video 310 may be any length of time. For example, a commercial break may be less than a minute in length (e.g., ten, twenty, or thirty seconds). In some embodiments, a commercial break may be a minute or longer in length (e.g., one minute and thirty seconds, two minutes, five minutes, and the like). In some embodiments, commercials may be queued and ready to play to the viewers of live video 310. In some embodiments, the commercials may be pre-cached on the viewer's display device (e.g., client system 130). For example, the viewers may be provided a notification while they are watching live video 310 that a commercial break will begin in a certain amount of time (e.g., in ten seconds). At that point, the personalized commercials for each viewer may be fetched and stored on the viewer's display device. This may enable the commercials to begin immediately when the commercial break begins without delay.

In some embodiments, commercials shown during commercial breaks of live video 310 may be chosen to match the type/category of live video 310. For example, if live video 310 is determined to have a type/category of "sports," commercials with a type/category of "sports" may be selected to play during the commercial breaks. In some embodiments, a profile of the broadcaster of live video 310 (e.g., user 101) and/or social graph 200 may be analyzed by social networking system 160 to determine the type/category of live video 310. For example, if the broadcaster is the host of a televised cooking show as determined from their profile, a live video 310 of the broadcaster may be determined to have a type/category of "cooking." Commercials that are displayed during the live video 310 of the host of the televised cooking show may then be filtered to only include those that match the type/category of "cooking."

In some embodiments, commercials shown during commercial breaks of live video 310 may be chosen to match a specific display aspect ratio. For example, social networking system 160 may analyze social graph 200 to determine the particular client device 130 that a viewer is using to view live video 310. Social networking system 160 may then determine that the particular client device 130 is optimized to show videos in one or more particular aspect ratios. The commercials selected to show to the viewer during the commercial breaks may then be selected to match the optimal aspect ratios of the particular client device 130.

In some embodiments, the broadcaster of live video 310 who choses to take one or more commercial breaks during live video 310 may receive compensation from social networking system 160 for taking the commercial breaks. In some embodiments, the compensation may be based on how many viewers are viewing live video 310. For example, if user 101 takes a commercial break during a live video 310 that has 100 viewers, user 101 may receive an amount of money per viewer (e.g., $.01 per viewer).

Figure 4:
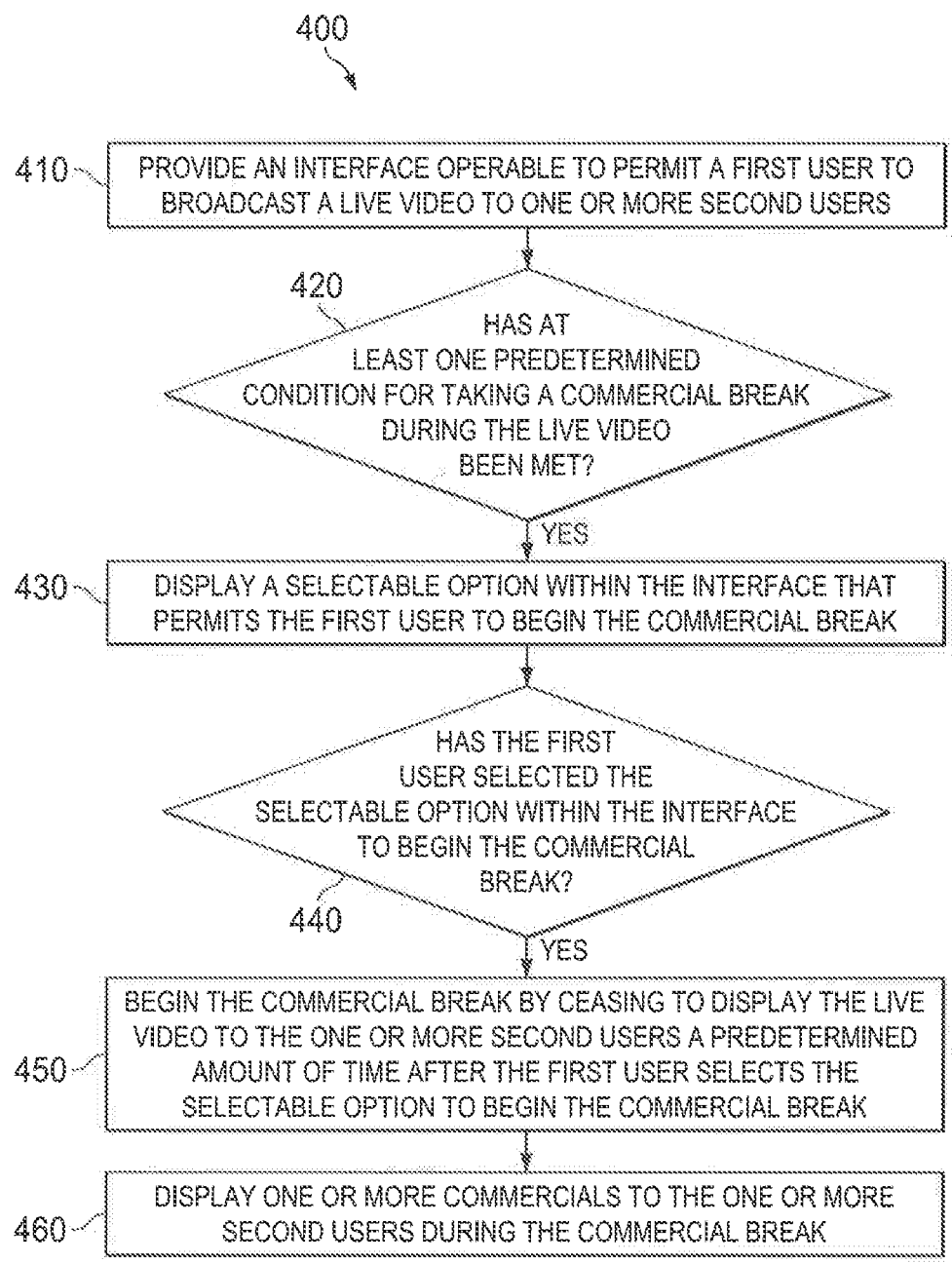
FIG. 4 illustrates an example method for providing commercial breaks during live videos.

FIG. 4 illustrates an example method 400 for providing commercial breaks during live videos. One or more steps of method 400 may be performed by one or more systems of social networking system 160. Method 400 may begin at step 410, where an interface is provided to a first user that permits the first user to broadcast a live video to one or more second users. In some embodiments, the interface of step 410 may be broadcaster interface 300 and the live video may be live video 310. In some embodiments, the first user is a broadcast user 101 (e.g., a user 101 who is broadcasting a live video to one or more second users 101 of social networking system 160).

At step 420, method 400 determines whether at least one of a plurality of predetermined conditions for taking a commercial break during the live video has been met. In some embodiments, step 420 may include determining whether one or more of the following predetermined conditions have been met: a minimum amount of time has elapsed since the live video began; a minimum amount of time has elapsed since a previous commercial break; the first user is a member of a pre-approved group of users; the first user has a number of followers at or above a threshold number of followers; the live video has a number of viewers at or above a threshold number of viewers; and one or more prior live videos by the first user had a watch rate at or above a threshold watch rate. If at least one of the predetermined conditions has been met, method 400 proceeds to step 430. Otherwise, method 400 may remain in step 420 and wait until at least one of the predetermined conditions has been met.

At step 430, method 400 displays a selectable option within the interface that permits the first user to begin the commercial break. In some embodiments, the selectable option may be commercial break option 340. In other embodiments, the selectable option of step 430 may be option 375 within commercial break available notification 370.

In step 440, method 400 determines whether the first user has selected the selectable option of step 430 to begin the commercial break. If the first user has selected the selectable option of step 430 to begin the commercial break, method 400 proceeds to step 450. Otherwise, method 400 may remain in step 440 or return to step 410.

In step 450, method 400 begins the commercial break by ceasing to display the live video to the one or more second users a predetermined amount of time after the first user selects the selectable option to begin the commercial break. For example, the commercial break may begin ten seconds after the first user selects the selectable option of step 430 to begin the commercial break. In some embodiments, step 450 may also include displaying a countdown timer to the first user before the beginning of the commercial break. The countdown timer, which may be first countdown timer 382, indicates an amount of time until the commercial break begins.

In step 460, method 400 displays one or more commercials to the one or more second users during the commercial break. In some embodiments, the one or more commercials are commercials that are relevant/personalized to each of the second users, as described above. In certain embodiments, comment area 330 may be removed or disabled for the viewers of live video 310 during the commercial break. In some embodiments, step 460 may also include displaying a countdown timer to the first user during at least a portion of the commercial break. The countdown timer of this step may be second countdown timer 390 and may indicate an amount of time until the commercial break is over. After step 460, method 400 may end.

In some embodiments, method 400 may additionally include resuming displaying the live video to the one or more second users after step 460 (i.e., after displaying the one or more commercials to the one or more second users during the commercial break).

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for providing commercial breaks during live videos including the particular steps of the method of FIG. 4, this disclosure contemplates any suitable method for providing commercial breaks during live videos including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
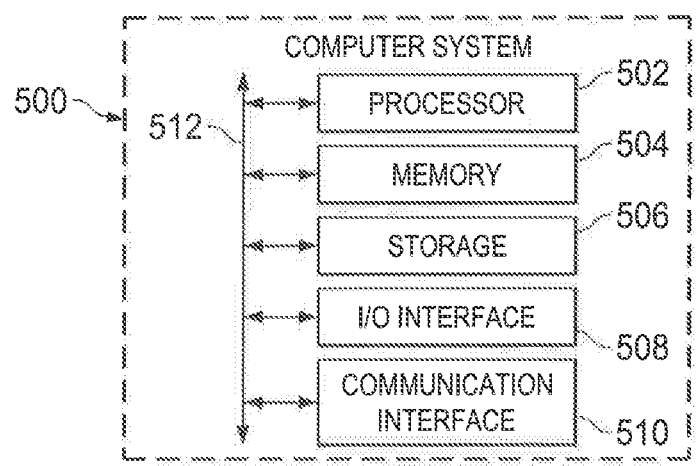
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory, in particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method, comprising:
    by one or more computing devices, providing an interface operable to permit a first user to broadcast a live video to one or more second users;
    by the one or more computing devices, determining whether at least one of a plurality of predetermined conditions for taking a commercial break during the live video has been met;
    by the one or more computing devices, causing displaying of a selectable option within the interface; and
    by the one or more computing devices, in response to receiving an indication that the first user has selected the selectable option within the interface:
        if it is determined that at least one of the plurality of predetermined conditions for taking the commercial break during the live video has been met:
            beginning the commercial break by ceasing to display the live video to the one or more second users a predetermined amount of time after the first user selects the selectable option; and
            causing displaying of one or more commercials to the one or more second users during the commercial break; and
        if it is determined that at least one of the plurality of predetermined conditions for taking the commercial break during the live video has not been met:
            causing displaying of a notification in the interface that indicates that the commercial break is currently unavailable.

2. The method of claim 1, wherein the plurality of predetermined conditions for taking the commercial break during the live video comprises:
    a minimum amount of time has elapsed since the live video began;
    a minimum amount of time has elapsed since a previous commercial break;
    the first user is a member of a pre-approved group of users;
    the first user has a number of followers at or above a threshold number of followers;
    the live video has a number of viewers at or above a threshold number of viewers; or
    one or more prior live videos by the first user had a watch rate at or above a threshold watch rate.

3. The method of claim 1, further comprising:
    by the one or more computing devices, resuming displaying the live video to the one or more second users after displaying the one or more commercials to the one or more second users during the commercial break.

4. The method of claim 1, further comprising:
    by the one or more computing devices, accessing a plurality of available commercials;

by the one or more computing devices, selecting, for each particular second user of the one or more second users, a plurality of relevant commercials from the plurality of available commercials, the plurality of relevant commercials being relevant to the particular second user; and by the one or more computing devices, selecting one or more of the relevant commercials as the one or more commercials that are displayed to the particular second user during the commercial break.

5. The method of claim 1, wherein the one or more second users are connected to the first user in a social graph, the social graph comprising a plurality of nodes and edges connecting the nodes, the nodes comprising user nodes that are each associated with a particular user of a social-networking system.

6. The method of claim 1, further comprising:
by the one or more computing devices, displaying a countdown timer to the first user before the beginning of the commercial break, the countdown timer indicating an amount of time until the commercial break begins.

7. The method of claim 1, further comprising:
by the one or more computing devices, displaying a countdown timer to the first user during at least a portion of the commercial break, the countdown timer indicating an amount of time until the commercial break is over.

8. One or more computer-readable non-transitory storage media embodying software that is operable when executed to:
provide an interface operable to permit a first user to broadcast a live video to one or more second users;
determine whether at least one of a plurality of predetermined conditions for taking a commercial break during the live video has been met;
cause display of a selectable option within the interface; and
in response to receiving an indication that the first user has selected the selectable option within the interface:
if it is determined that at least one of the plurality of predetermined conditions for taking the commercial break during the live video has been met:
begin the commercial break by ceasing to display the live video to the one or more second users a predetermined amount of time after the first user selects the selectable option; and
cause display of one or more commercials to the one or more second users during the commercial break; and
if it is determined that at least one of the plurality of predetermined conditions for taking the commercial break during the live video has not been met:
cause display of a notification in the interface that indicates that the commercial break is currently unavailable.

9. The media of claim 8, wherein the plurality of predetermined conditions for taking the commercial break during the live video comprises:
a minimum amount of time has elapsed since the live video began;
a minimum amount of time has elapsed since a previous commercial break;
the first user is a member of a pre-approved group of users;
the first user has a number of followers at or above a threshold number of followers;
the live video has a number of viewers at or above a threshold number of viewers; or
one or more prior live videos by the first user had a watch rate at or above a threshold watch rate.

10. The media of claim 8, the software further operable when executed to:
access a plurality of available commercials;
select, for each particular second user of the one or more second users, a plurality of relevant commercials from the plurality of available commercials, the plurality of relevant commercials being relevant to the particular second user; and
select one or more of the relevant commercials as the one or more commercials that are displayed to the particular second user during the commercial break.

11. The media of claim 8, wherein the one or more second users are connected to the first user in a social graph, the social graph comprising a plurality of nodes and edges connecting the nodes, the nodes comprising user nodes that are each associated with a particular user of a social-networking system.

12. The media of claim 8, the software further operable when executed to:
display a countdown timer to the first user before the beginning of the commercial break, the countdown timer indicating an amount of time until the commercial break begins.

13. The media of claim 8, the software further operable when executed to:
display a countdown timer to the first user during at least a portion of the commercial break, the countdown timer indicating an amount of time until the commercial break is over.

14. A system comprising:
one or more processors; and
a memory coupled to the one or more processors, the memory comprising instructions executable by the one or more processors, the one or more processors being operable when executing the instructions to:
provide an interface operable to permit a first user to broadcast a live video to one or more second users;
determine whether at least one of a plurality of predetermined conditions for taking a commercial break during the live video has been met;
cause display of a selectable option within the interface; and
in response to receiving an indication that the first user has selected the selectable option within the interface:
if it is determined that at least one of the plurality of predetermined conditions for taking the commercial break during the live video has been met:
begin the commercial break by ceasing to display the live video to the one or more second users a predetermined amount of time after the first user selects the selectable option; and
cause display of one or more commercials to the one or more second users during the commercial break; and
if it is determined that at least one of the plurality of predetermined conditions for taking the commercial break during the live video has not been met:
cause display of a notification in the interface that indicates that the commercial break is currently unavailable.

15. The system of claim 14, wherein the plurality of predetermined conditions for taking the commercial break during the live video comprises:

a minimum amount of time has elapsed since the live video began;

a minimum amount of time has elapsed since a previous commercial break;

the first user is a member of a pre-approved group of users;

the first user has a number of followers at or above a threshold number of followers;

the live video has a number of viewers at or above a threshold number of viewers; or one or more prior live videos by the first user had a watch rate at or above a threshold watch rate.

16. The system of claim 14, wherein the one or more processors are further operable when executing the instructions to:

resume displaying the live video to the one or more second users after displaying the one or more commercials to the one or more second users during the commercial break.

17. The system of claim 14, wherein the one or more processors are further operable when executing the instructions to:

access a plurality of available commercials;

select, for each particular second user of the one or more second users, a plurality of relevant commercials from the plurality of available commercials, the plurality of relevant commercials being relevant to the particular second user; and select one or more of the relevant commercials as the one or more commercials that are displayed to the particular second user during the commercial break.

18. The system of claim 14, wherein the one or more second users are connected to the first user in a social graph, the social graph comprising a plurality of nodes and edges connecting the nodes, the nodes comprising user nodes that are each associated with a particular user of a social-networking system.

19. The system of claim 14, wherein the one or more processors are further operable when executing the instructions to:

display a countdown timer to the first user before the beginning of the commercial break, the countdown timer indicating an amount of time until the commercial break begins; and display a countdown timer to the first user during at least a portion of the commercial break, the countdown timer indicating an amount of time until the commercial break is over.

20. The method of claim 1, further comprising:

by the one or more computing devices, changing a visual appearance of the selectable option in response to determining that at least one of the plurality of predetermined conditions for taking the commercial break during the live video has been met.

21. The method of claim 1, further comprising:

causing display of the predetermined amount of time within the interface during the broadcast of the live video to the one or more second users.

22. The method of claim 1, further comprising:

by the one or more computing devices, selecting at least one of the commercials determined to be relevant to at least one user of the second users based on one or more detected interests of the at least one user of the second users.

23. The method of claim 22, wherein displaying of the at least one commercial to the at least one user of the second users is different from displaying of another commercial of the commercials to another user of the second users.

* * * * *